(12) United States Patent
Huang et al.

(10) Patent No.: US 12,133,829 B2
(45) Date of Patent: Nov. 5, 2024

(54) AIRWAY STRUCTURE OF A MASSAGE POOL WITH A CONTROL VALVE

(71) Applicant: Intex Marketing Ltd., Tortola (VG)

(72) Inventors: Zhi Xiong Huang, Fujian (CN); Ai Ming Tan, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 18/577,294

(22) PCT Filed: Jul. 15, 2022

(86) PCT No.: PCT/IB2022/056536
§ 371 (c)(1),
(2) Date: Jan. 8, 2024

(87) PCT Pub. No.: WO2023/286025
PCT Pub. Date: Jan. 19, 2023

(65) Prior Publication Data
US 2024/0261185 A1 Aug. 8, 2024

(30) Foreign Application Priority Data
Jul. 15, 2021 (CN) .......................... 202121614976.X

(51) Int. Cl.
*A61H 33/00* (2006.01)
*F16K 3/08* (2006.01)

(52) U.S. Cl.
CPC ............ *A61H 33/6005* (2013.01); *F16K 3/08* (2013.01); *A61H 2201/0103* (2013.01); *A61H 2201/5056* (2013.01)

(58) Field of Classification Search
CPC ........ A61H 33/6005; A61H 2201/0103; A61H 2201/5056; F16K 3/08
See application file for complete search history.

(56) References Cited

U.S. PATENT DOCUMENTS

| 3,810,464 A | 5/1974 | Sheeler |
| 4,566,443 A | 1/1986 | Bucher |
(Continued)

FOREIGN PATENT DOCUMENTS

| CN | 1596864 A | 3/2005 |
| CN | 2794505 Y | 7/2006 |
(Continued)

OTHER PUBLICATIONS

International Search Report and Written Opinion issued by the International Searching Authority, dated Oct. 10, 2022, for International Patent Application No. PCT/IB2022/056536; 10 pages.
(Continued)

*Primary Examiner* — Scott M. Getzow
(74) *Attorney, Agent, or Firm* — Faegre Drinker Biddle & Reath LLP

(57) ABSTRACT

An airway structure of a massage pool may include a control valve. The airway structure may comprise an air connection passage with an air connection port and a control plate rotatable relative to the air connection port. A control valve may be installed at the air connection port. The control valve may have a valve core portion that can slide between an open position and a closed position relative to the air connection port. The control plate may be provided with a ventilation port, an open area and a closed area. A position of the open area and the closed area may be controlled by the rotation of the control plate to match the valve core portion. The control plate and the valve core portion may be in a transmission connection and the rotation of the control plate may drive the valve core to slide, and the valve core portion is in the open position through the cooperation of the open area and the valve core portion to open the air connection port and the ventilation port and the air connection port are connected, and the valve core portion is in the closed (Continued)

position through the cooperation of the closed area and the valve core portion to close the air connection port.

10 Claims, 10 Drawing Sheets

(56) References Cited

U.S. PATENT DOCUMENTS

| | | | |
|---|---|---|---|
| 4,773,104 | A | 9/1988 | Wang |
| 4,981,543 | A | 1/1991 | Popovich et al. |
| 5,283,915 | A | 2/1994 | Idland et al. |
| 5,809,942 | A | 9/1998 | Kralovec et al. |
| 6,003,166 | A | 12/1999 | Hald et al. |
| 6,108,829 | A | 8/2000 | Wadsworth |
| 6,199,224 | B1 | 3/2001 | Versland |
| 6,357,059 | B1 | 3/2002 | Lau |
| 6,412,123 | B1 | 7/2002 | Lau |
| 7,334,274 | B2 | 2/2008 | Wang |
| 7,503,082 | B2 | 3/2009 | Castellote |
| 2005/0050627 | A1 | 3/2005 | Ayeni et al. |
| 2006/0115248 | A1 | 6/2006 | Tran |
| 2006/0260038 | A1 | 11/2006 | Lau |
| 2011/0010836 | A1 | 1/2011 | Lau |
| 2012/0124732 | A1 | 5/2012 | Lau |
| 2018/0231283 | A1 | 8/2018 | Willers et al. |
| 2022/0241148 | A1 | 8/2022 | Wang |
| 2022/0325546 | A1 | 10/2022 | Lin et al. |

FOREIGN PATENT DOCUMENTS

| | | |
|---|---|---|
| CN | 202732280 U | 2/2013 |
| CN | 109424221 A | 3/2019 |
| CN | 111895140 | 11/2020 |
| CN | 112443180 A | 3/2021 |
| CN | 112502498 | 3/2021 |
| EP | 0168822 A2 | 1/1986 |
| EP | 0967446 A2 | 12/1999 |
| JP | 2006-308009 A | 11/2006 |
| JP | 4041132 | 1/2008 |
| WO | 2015/010058 A2 | 1/2015 |
| WO | 2021/042966 A1 | 3/2021 |

OTHER PUBLICATIONS

International Preliminary Report on Patentability issued by the International Preliminary Examining Authority, dated Jun. 5, 2023, for International Patent Application No. PCT/IB2022/056536; 18 pages.

AIRWAY STRUCTURE OF A MASSAGE POOL WITH A CONTROL VALVE

RELATED APPLICATIONS

The present application is a national stage entry of International (PCT) Patent Application Number PCT/IB2022/056536, filed Jul. 15, 2022, which claims priority to Chinese Application No. CN202121614976.X, filed Jul. 15, 2021, the entire disclosures of which are expressly incorporated by reference herein.

Additionally, the present application is related to Chinese Utility Model Application No.: CN202121613803.6 filed Jul. 15, 2021: Chinese Utility Model Application No. CN202121613882.0, filed Jul. 15, 2021; Chinese Patent Application No. CN202110800425.0, filed Jul. 15, 2021; Chinese Utility Model Application No. CN202121613986.1, filed Jul. 15, 2021; Chinese Patent Application No. CN202110801708.7, filed Jul. 15, 2021; and Chinese Utility Model Application No. CN202121618990.7, filed Jul. 15, 2021, the entire disclosures of which are expressly incorporated by reference herein.

FIELD

The present disclosure relates to the technical field of massage pool accessories, in particular to an airway structure of a massage pool with a control valve.

BACKGROUND

The existing massage pool comprises a pool body and a pool chamber surrounded by the pool body. The pool body is formed with an air cavity and has an air connection passage connected to the air cavity, and the air connection passage has an air connection port. During use, the air pump is connected to the air connection port to inflate the air cavity, and a sealing cover must be provided to close the air connection port after inflation. The above-mentioned massage pool has the following shortcomings: the operation is complicated and the use is inconvenient.

SUMMARY

In an exemplary embodiment, the present disclosure provides an airway structure of a massage pool. The airway structure may include a control valve.

In another exemplary embodiment, an airway structure of a massage pool with a control valve is provided. The airway structure comprises an air connection passage with an air connection port and a control plate that may rotate relative to the air connection port. A control valve is installed at the air connection port. The control valve has a valve core portion that may slide between an open position and a closed position relative to the air connection port. The control plate is provided with a ventilation port, an open area and a closed area. The open area or the closed area is controlled by the rotation of the control plate to match the valve core portion. The control plate and the valve core portion are in a transmission connection and the rotation of the control plate may drive the valve core to slide. The valve core portion is in the open position through the cooperation of the open area and the valve core portion to open the air connection port and the ventilation port and the air connection port are connected. The valve core portion is in the closed position through the cooperation of the closed area and the valve core portion to close the air connection port.

In an example thereof the control valve further comprises a valve base and an elastic body. The valve base is fixedly mounted on the air connection port. The valve core portion is slidably connected to the valve base. The elastic body is arranged between the valve core portion and the valve base and generates an elastic force to return to the closed position. The bottom surface of the control plate and the valve core portion abut and fit, and the closed area and the open area are located on the bottom surface of the control plate. The open area is in a protruding arrangement relative to the closed area.

In another example thereof, the valve base comprises a sleeve and a guide base fixed outside the sleeve. The guide base is provided with a guide groove. The valve core portion comprises a valve core, a sealing portion fixed on the inner end of the valve core and a lug fixed on the outer end of the valve core. The valve core passes through the sleeve. A gap forming a channel is formed between the valve core and the sleeve. The sealing portion is fitting with the inner port of the sleeve. The lug is connected to the guide groove.

In a further example thereof, the inner wall of the sleeve is protruded with at least two first protruding strips. The valve core is provided with a second protruding strip. The end surface of the first protruding strips and the end surfaces of the second protruding strips are contacted in one-to-one correspondence. Air passages are formed between two adjacent first protruding strips and between two adjacent second protruding strips.

In yet a further example thereof, the elastic body is sleeved on the valve core and abuts between the end of the first protruding strip and the flange protruding from the valve core.

In still another example thereof, the ventilation port is arranged through the open area.

In yet another example thereof, the closed area and the open area of the bottom surface of the control plate are provided with a guide structure capable of cooperating with the valve core.

In still a further example thereof, the control plate can be rotated relative to the air connection port to the first position, the second position and a middle position between the first position and the second position. The closed area of the control plate at the middle position is matched with the valve core portion, and the open area of the control plate at the first position and the second position is matched with the valve core portion.

In a further still example, the airway structure further comprises an air connection portion. The air connection portion is provided with the air connection passage. The air connection portion is protruded with a connecting base. The upper end surface of the connecting base is concavely provided with the above-mentioned air connection port and a C-shaped groove which can be connected to the air inlet. The ventilation port of the control plate located at the second position are aligned and connected to the air connection port, and the ventilation port of the control plate located at the first position is connected to the C-shaped groove.

In another still further example, the airway structure comprises an air connection portion. The air connection portion is provided with the air connection passage. The air connection portion is protruded with a connecting base. The upper end surface of the connection base is concavely provided with the air connection port and the C-shaped groove which can be connected to the air connection port. The ventilation portion of the control plate at the first position and the second position is connected to the C-shaped groove.

In a further exemplary embodiment, the control plate and the valve core portion are connected in a driving manner, and the valve core portion can be driven to slide by the rotation of the control plate. The open area and the valve core portion cooperate to make the valve core portion in the closed position to open the air connection portion and the ventilation portion is connected to the air connection portion, the closed area and the valve core portion cooperate to make the valve core portion in the closed position to close the air connection port, and the ventilation portion and the air connection port can be controlled to open or close through the rotation of the control plate, so as to realize inflation, exhaust and close. An advantage, among others is that the operation is easy and the sealing performance is good. The open area is protrudingly arranged relative to the closed area, and the valve core portion can be driven to slide by rotating the control plate, which is convenient to operate and stable and reliable to control.

BRIEF DESCRIPTION OF DRAWINGS

The foregoing aspects and many of the intended advantages of this disclosure will become more readily appreciated as the same becomes better understood by reference to the following detailed description when taken in conjunction with the accompanying drawings.

Figure 1:
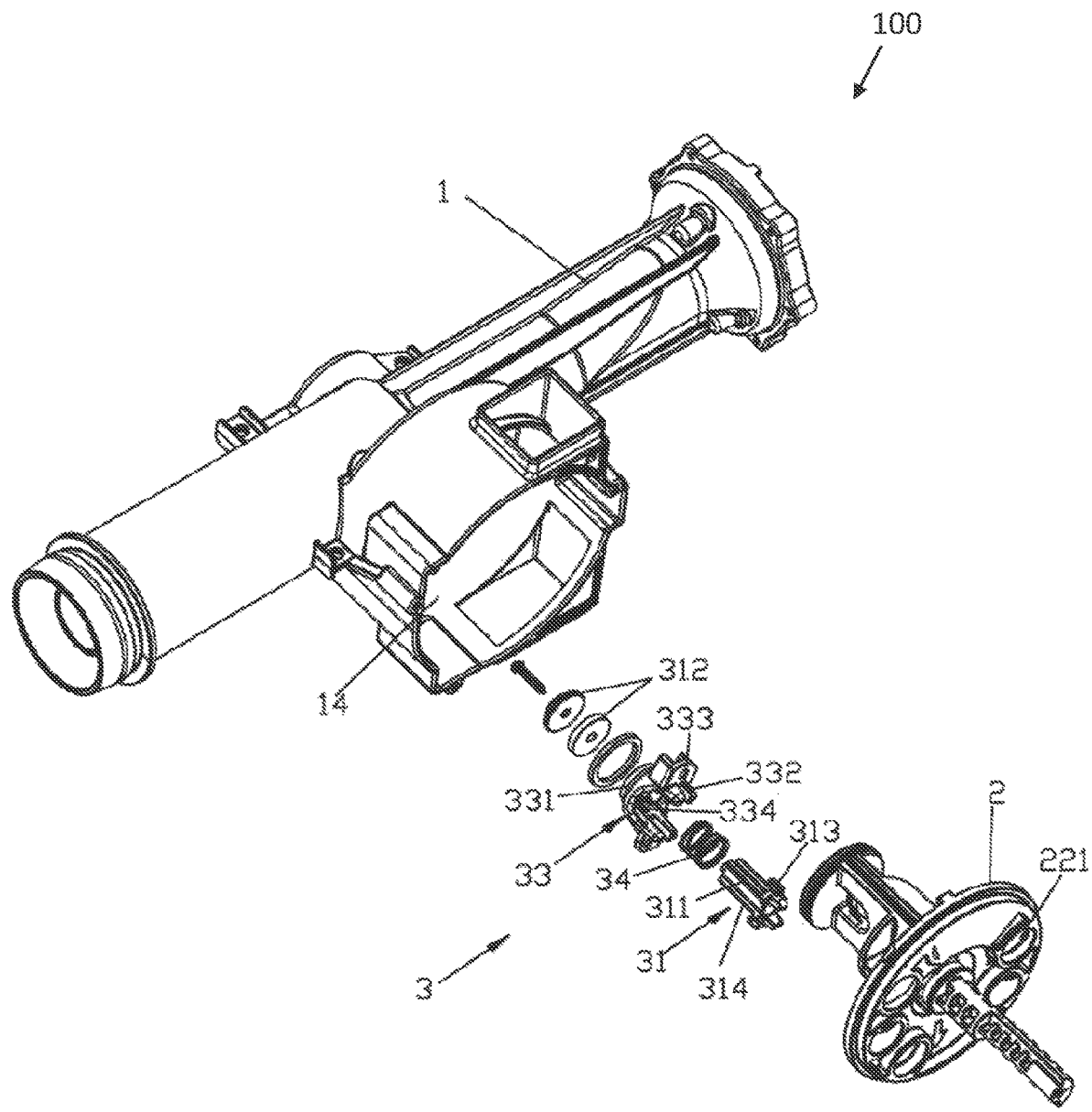
FIG. 1 illustrates a first perspective exploded view of an exemplary airway structure of a massage pool with a control valve.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION OF THE DRAWINGS

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

In the description, it should be noted that the terms upper, lower, inner, outer, top/bottom, etc. indicating the orientation or positional relationship based on the orientation shown in the drawings are only for the convenience of simplifying the description, rather than indicating or implying that the pointed device or element must have a specific orientation, be constructed and operated in a specific orientation, and therefore cannot be understood as a limitation of the present disclosure. In addition, the terms first and second are only used for descriptive purposes, and cannot be understood as indicating or implying relative importance.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

The airway structure and massage pool disclosed in this present disclosure is related to the following applications: CN202121613803.6 filed Jul. 15, 2021; Chinese Utility Model Application No. CN202121613882.0, filed Jul. 15, 2021; Chinese Patent Application No. CN202110800425.0, filed Jul. 15, 2021; Chinese Utility Model Application No. CN202121613986.1, filed Jul. 15, 2021; Chinese Patent Application No. CN202110801708.7, filed Jul. 15, 2021; and Chinese Utility Model Application No. CN202121618990.7, filed Jul. 15, 2021, the entire disclosures of which are expressly incorporated by reference herein.

Additionally, the present application is related to PCT Patent Application No. PCT/IB2022/056545, filed Jul. 15, 2022, titled AN AIRWAY SYSTEM OF A MASSAGE POOL, COMPRISES AN AIR PUMP AND AN AIRWAY UNIT; PCT Patent Application No. PCT/IB2022/056556, filed Jul. 15, 2022, titled AIRWAY STRUCTURE OF A MASSAGE POOL WITH COMPENSATION FUNCTION AND A MASSAGE POOL; PCT Patent Application No. PCT/IB2022/056542, filed Jul. 15, 2022, titled AN AIR CONNECTION PIPING DEVICE FOR A MASSAGE POOL, A POOL BODY OF A MASSAGE POOL AND A MASSAGE POOL, the entire disclosures of which are expressly incorporated by reference herein.

Referring to FIGS. 1-8, an airway structure 100 of a massage pool with a control valve comprises an air connection portion 1, a ring wall 14 and a control plate 2. The air connection portion 1 is provided with an air connection passage 11 (see FIG. 3). The air connection portion 1 is fixedly connected with the ring wall 14. The air connection portion 1 is protruded with a connecting base 12 (see FIG. 3) located in the ring wall 14. An upper end surface of the connecting base 12 is concavely provided with the air connection port 13 of the air connection passage 11 of the air connection portion 1.

The control plate 2 is rotatably connected in the ring wall 14 and the control plate 2 contacts and abuts on the connecting base 12. A control valve 3 is installed at the air connection port 13. The control valve 3 has a valve core portion 31 that may slide relative to the air connection port 13 between an open position and a closed position. The control plate 2 is provided with a ventilation port 221, a closed area 222 (see FIGS. 1B and 5) and an open area 223 (see FIGS. 1B and 3). The closed area 222 and the open area 223 are arranged on the bottom surface of the control plate 2. The open area 223 is protruded from the closed area 222. The ventilation port 221 is arranged through the open area 223. The control plate 2 rotates to control the closed area 222 such as the closed area 222 to abut against the valve core portion 31. The control plate 2 is connected to the valve core portion 31 in a driving manner. The valve core portion 31 may be driven to slide by the rotation of the control plate 2. The open area 223 is matched with the valve core portion to make valve core portion 31 in the open position to open the air connection port 13 and the ventilation port 221 is connected to the air connection port 13. The closed area 222 is matched with the valve core portion 31 to make the valve core portion 31 in the closed position to close the air connection port 13. During the rotation of the control plate 2 from the closed area to the open area, it may drive the valve core portion 31 to move to the open position by pressing against the valve core portion 31. When it rotates from the open area to the closed area, it is reset to the closed position under the action of the elastic body, which is easy to operate and has a simple and compact structure. Preferably, the closed area 222 and the open area 223 of the bottom surface of the control plate 2 are provided with a guide structure capable of cooperating with the valve core portion 31. In embodiments, the guide structure is an inclined surface.

In embodiments, the connecting base 12 is further recessed with a C-shaped groove 121 (see FIG. 3) that may be connected to the air connection port 13. The control plate 2 may rotate with respect to the air connection port 13 to a first position (in the air intake state) and a second position (in the exhaust state) and a middle position between the first position and the second position (in the closed state). The closed area 222 of the control plate 2 in the middle position cooperates with the valve core portion 31. The open area 223 of the control plate 2 in the first position and the second position is matched with the valve core portion 31, specifically: the ventilation port 221 of the control plate 2 in the second position and the air connection port 13 are staggered and connected (or aligned or connected through the C-shaped groove) so that the air in the air connection passage is exhausted through the ventilation port 221 (the air entering the C-shaped groove does not affect the exhaust), the ventilation port 221 of the control plate 2 at the first position is connected to the C-shaped groove 121, that is, through the C-shaped groove 121, the air connection port and the ventilation port are connected to inflate the air connection passage 11. Therefore, the rotation of the control plate 2 may control exhaust (the ventilation port and the air connection port are aligned and connected), inflation (the ventilation port and the air connection port are connected through the C-shaped groove) or closed (the closed area closes the air connection port). Three states may be chosen by the rotation of the control plate, the operation is easy, and the airway is stable and reliable.

Figure 1A:
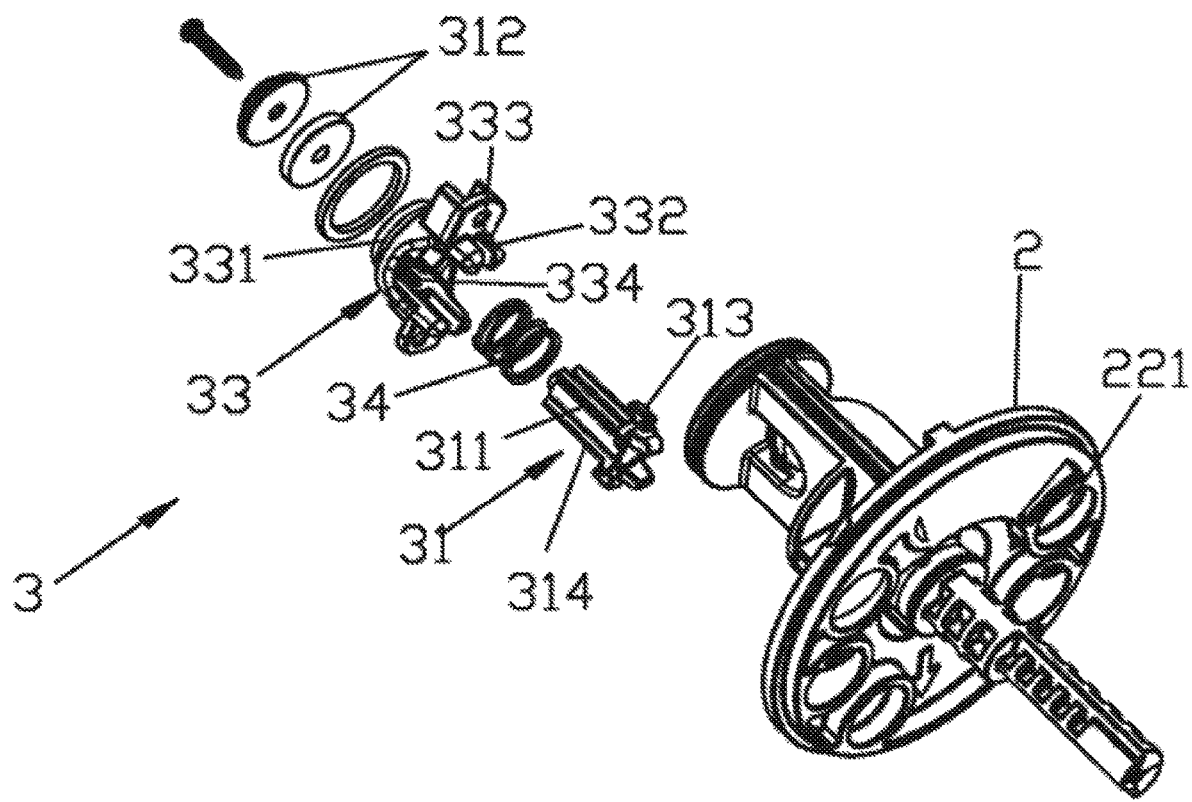
FIG. 1A illustrates a detail view of a portion of the exemplary airway structure of FIG. 1.
Figure 1B:
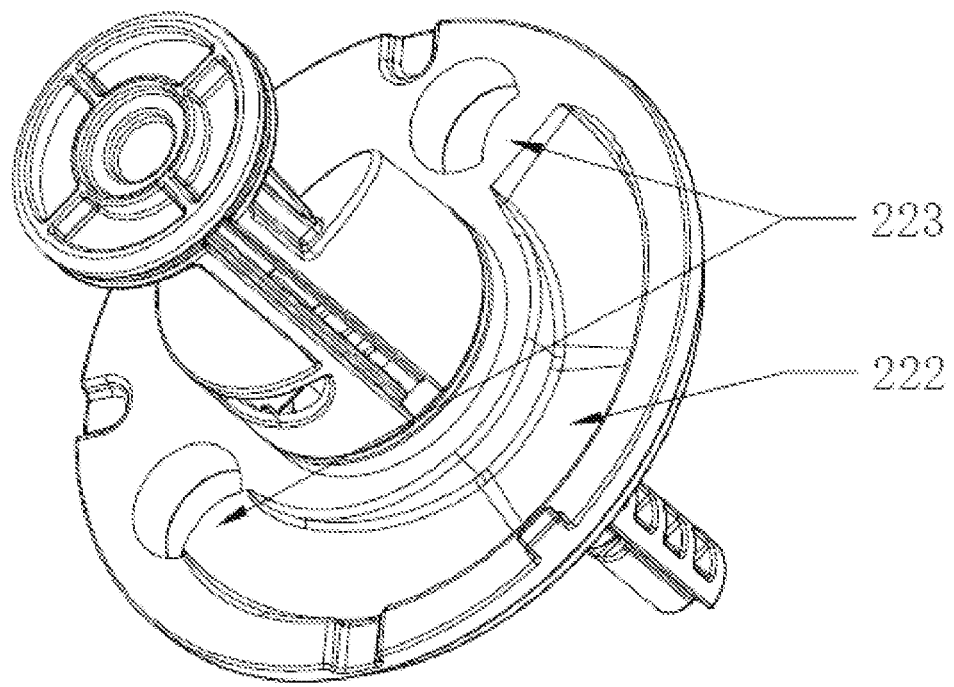
FIG. 1B illustrates a rear side view of a control plate of the exemplary airway structure of FIG. 1.
Figure 2:
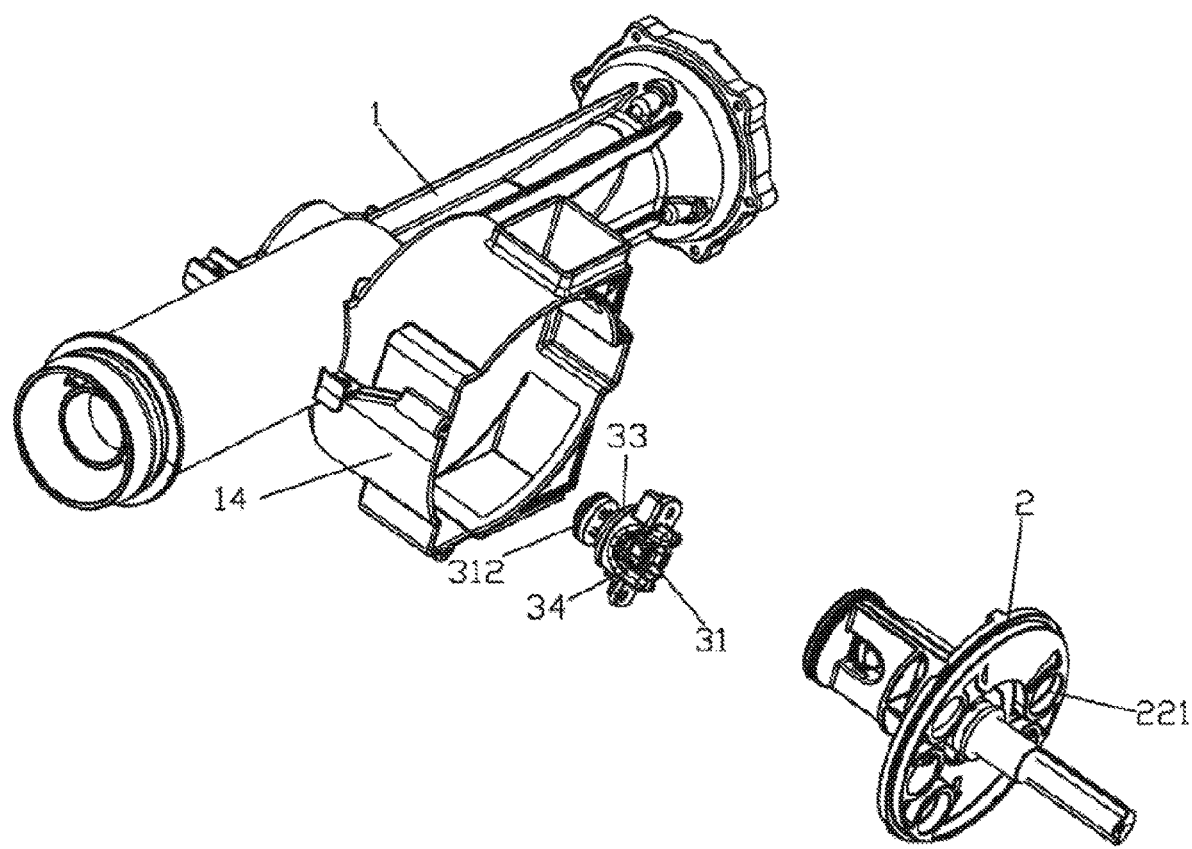
FIG. 2 illustrates a second perspective exploded view of the exemplary airway structure of a massage pool with a control valve of FIG. 1.
Figure 3:
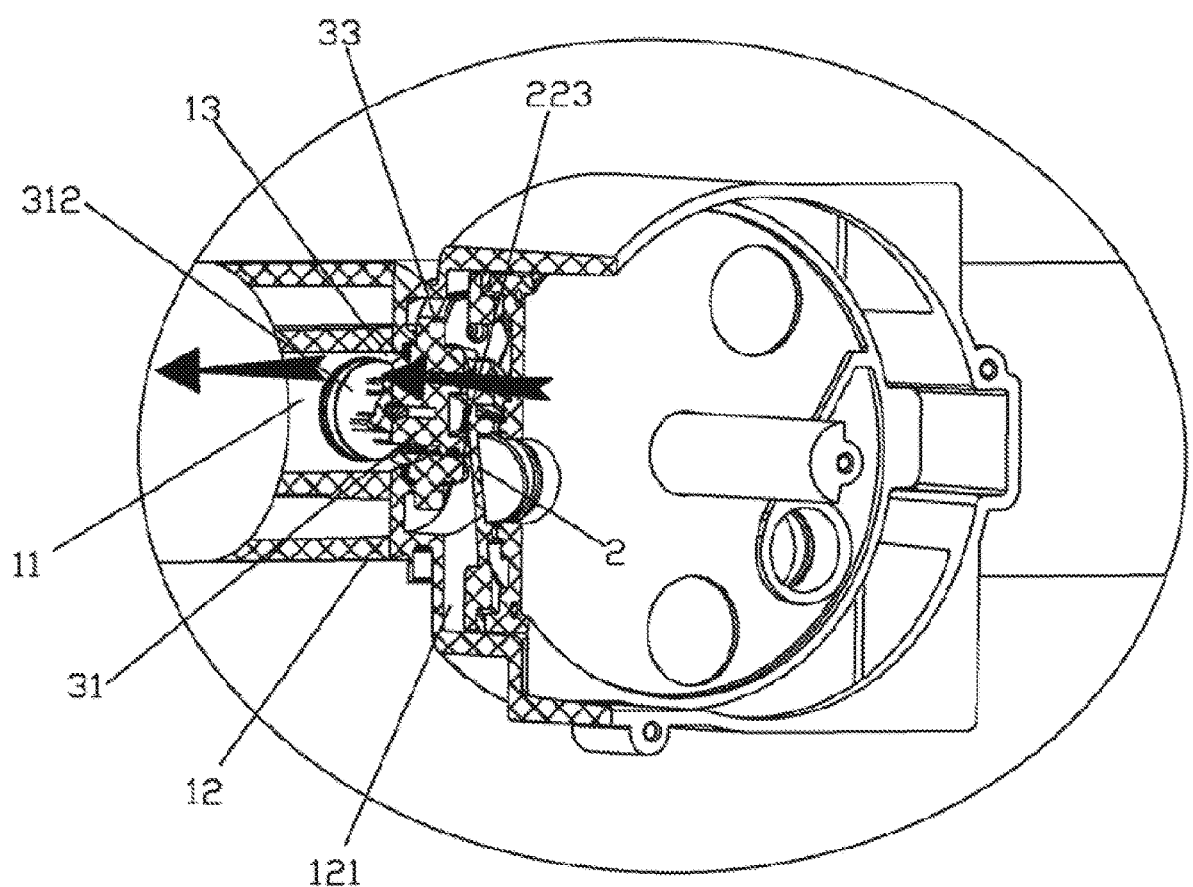
FIG. 3 illustrates a perspective sectional view of the exemplary airway structure of a massage pool with a control valve of FIG. 1 in an air intake state.
Figure 4:
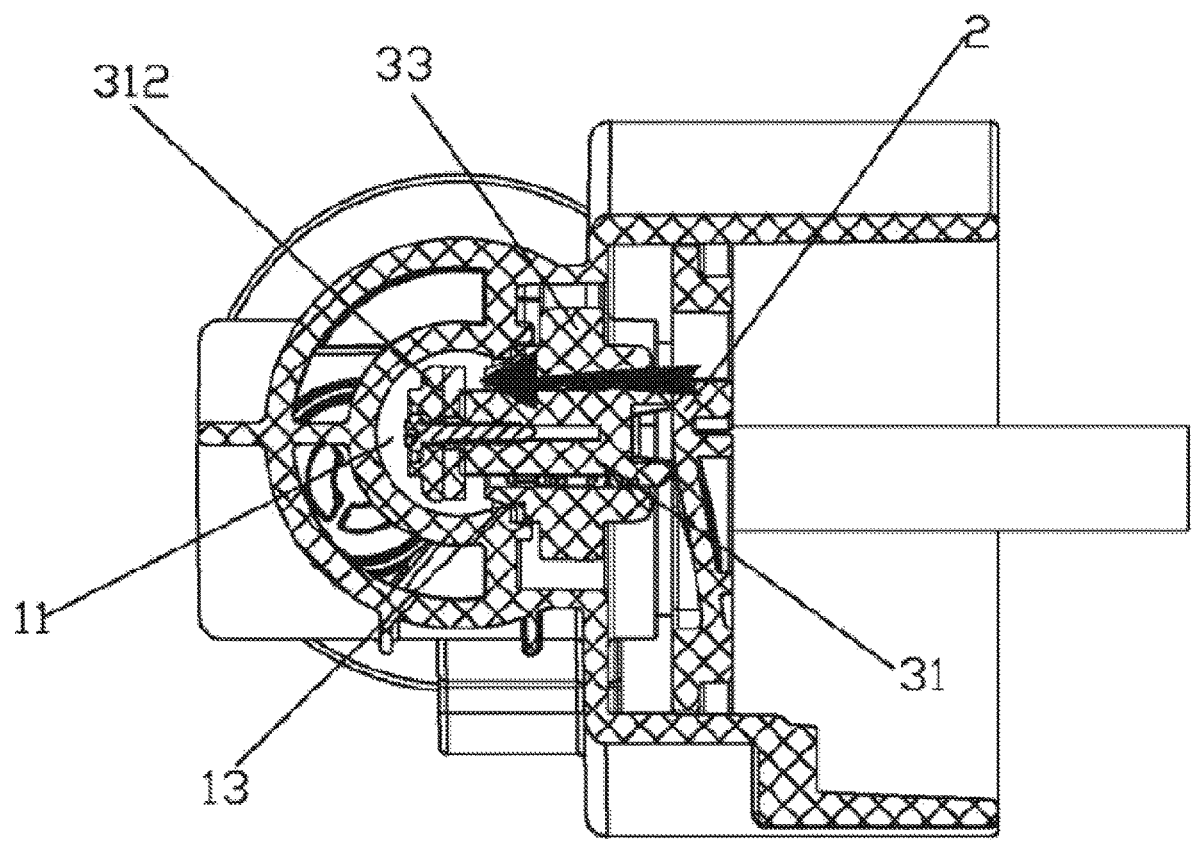
FIG. 4 illustrates a sectional view of the exemplary airway structure of a massage pool with a control valve of FIG. 1 in an air intake state.
Figure 5:
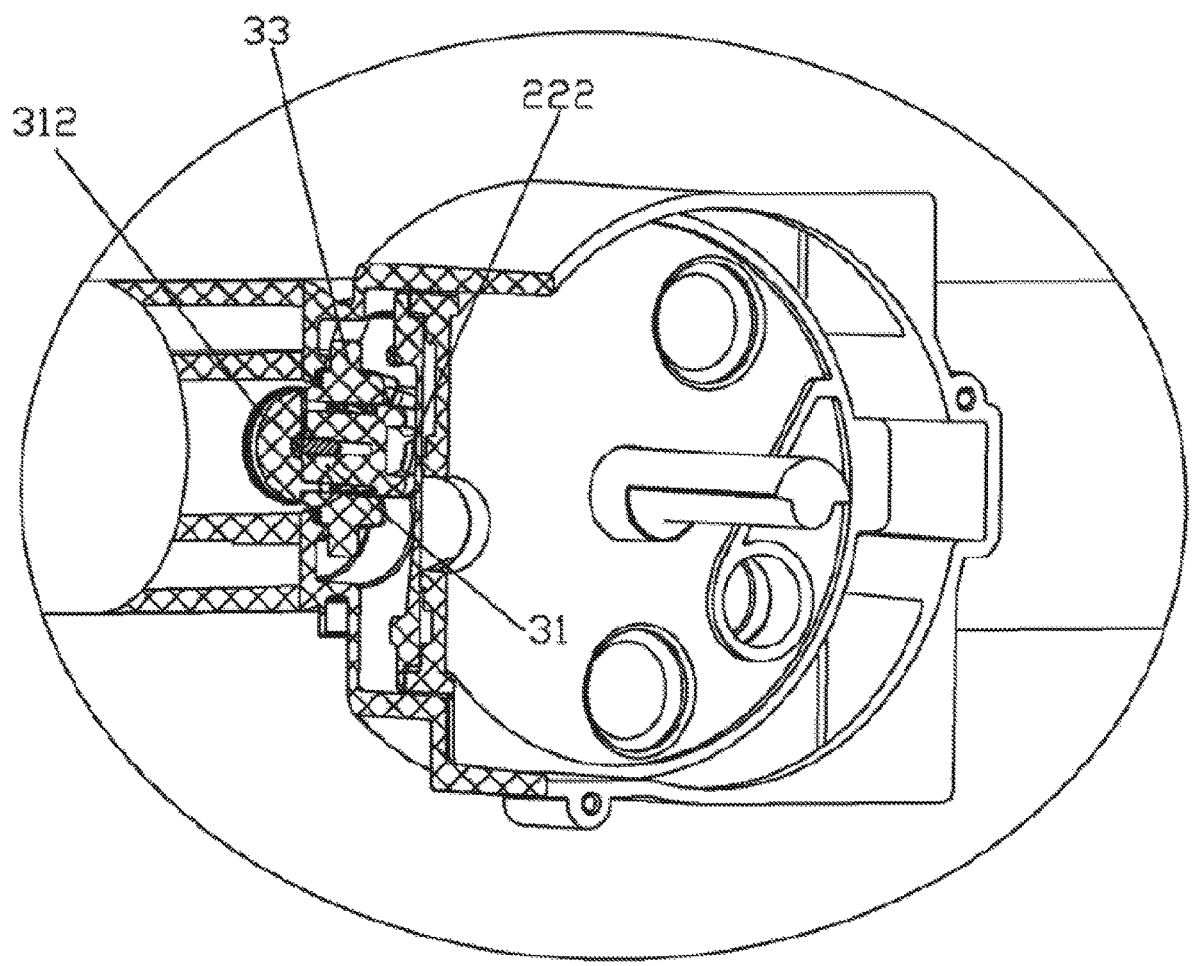
FIG. 5 illustrates a perspective sectional view of the exemplary airway structure of a massage pool with a control valve of FIG. 1 in a closed state.
Figure 6:
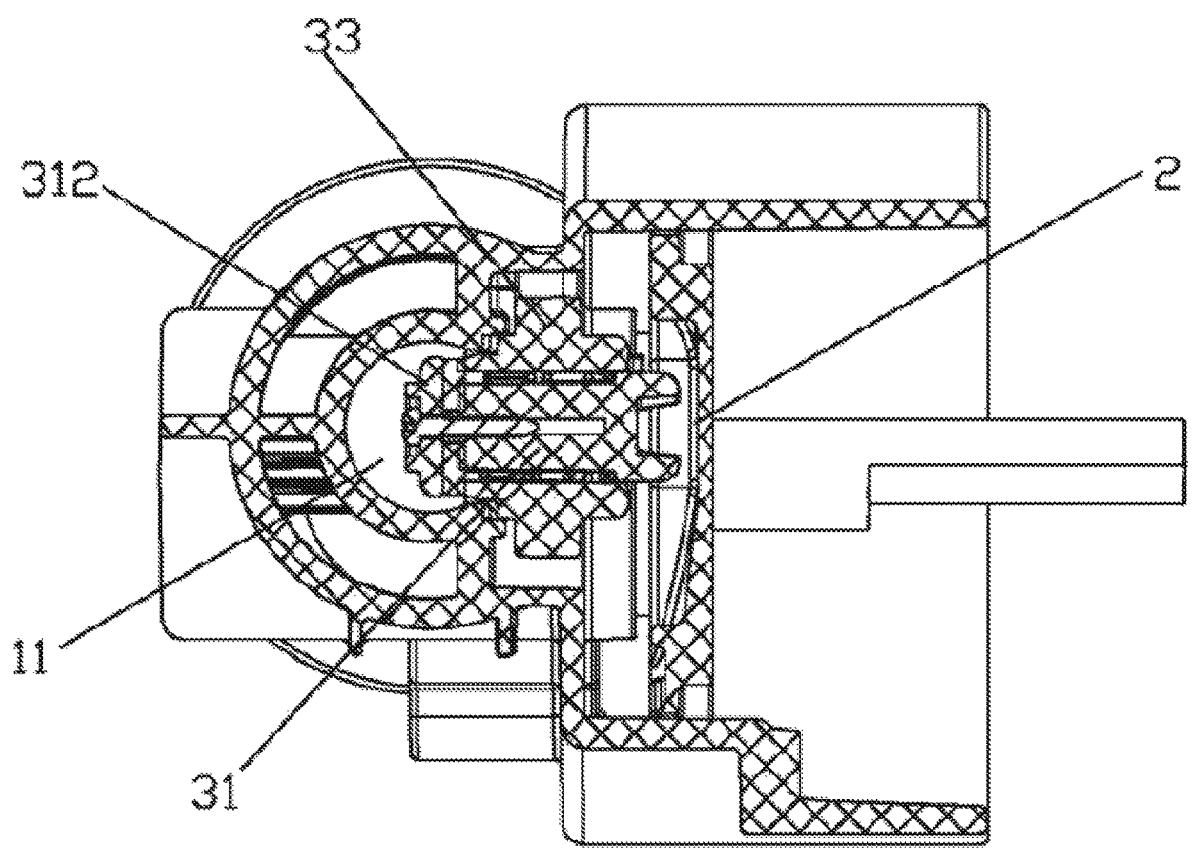
FIG. 6 illustrates a sectional view of the exemplary airway structure of a massage pool with a control valve of FIG. 1 in a closed state.
Figure 7:
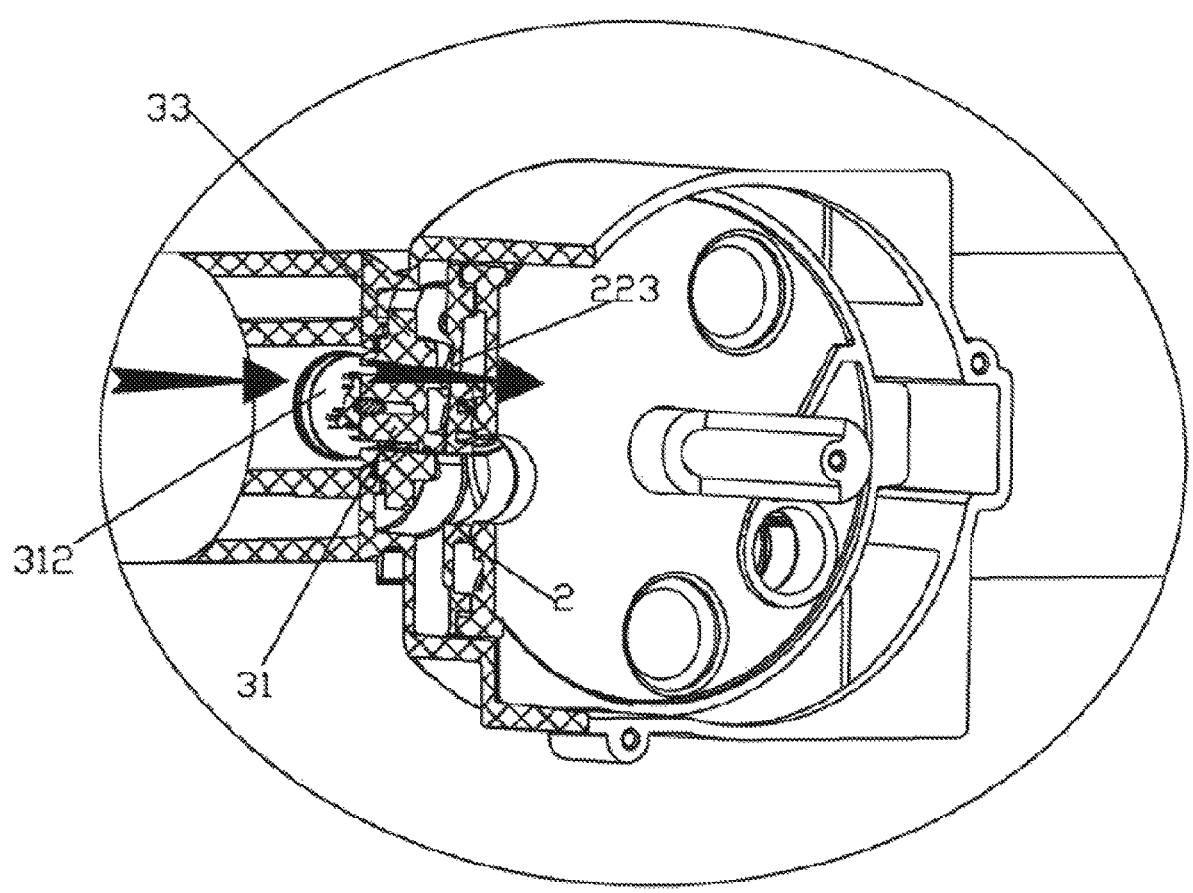
FIG. 7 illustrates a perspective sectional view of the airway structure of a massage pool with a control valve of FIG. 1 in an exhaust state.
Figure 8:
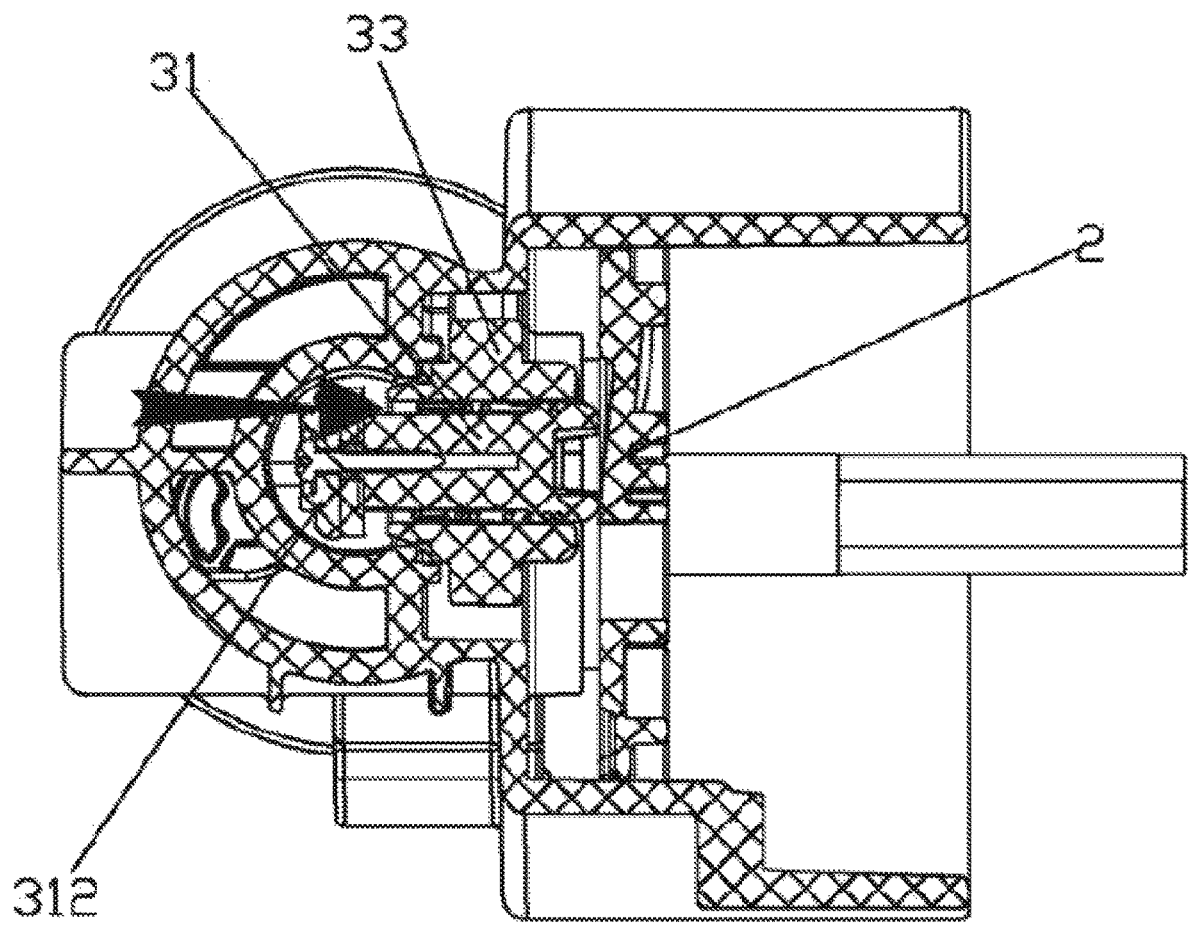
FIG. 8 is a sectional view of the airway structure of a massage pool with a control valve of FIG. 1 in an exhaust state.

In embodiments, referring to FIGS. 1 and 1A, the control valve 3 further has a valve base 33 and an elastic body 34. The valve base 33 is fixedly mounted on the air connection port 13. The valve core portion 31 is slidably connected to the valve base 33. The elastic body 34 is provided between the valve core portion 31 and the valve base 33 and generates an elastic force to reset to the closed position. The valve base 33 comprises a sleeve 331 that may be fixedly inserted into the air connection port 13 and a guide base 332 fixed to the outside of the sleeve 331. The guide base 332 is provided with a guide groove 333. The valve core portion 31 comprises a valve core 311, a sealing portion 312 fixed on the inner end of the valve core 311 and a lug 313 fixed on the outer end of the valve core 311. The sealing portion is fixed on the outer end of the valve core by screws. The valve core 311 passes through the sleeve 331 and a gap is formed between the valve core 311 and the sleeve 331 to form a channel. The sealing portion 312 is matched with the inner port of the sleeve 331 (in the open position, the sealing portion is isolated from the inner port of the sleeve 331 to be in the open state, in the closed position, the sealing portion seals the inner port of the sleeve to be in the closed state). The lug 313 is connected to the guide groove 333 to provide a guide for the valve core portion to slide. Further, the inner wall of the sleeve 331 is protruded with at least two first protruding strips 334. The valve core 311 has second protruding strips 314. The end surfaces of the first protruding strips 334 and the end surfaces of the second protruding strips 314 are in a one-to-one correspondence with each other. An air passage is formed between two adjacent first protruding strips 334 and between two adjacent second protruding strips 314. This structure may, among other advantages, improve the ventilation cross-sectional area of the air passage, provide a simply layout, a compact structure, and the sealing performance is good . . . The elastic body 34 is sleeved with the valve core 311 and pressed against the end of the first protruding strip 334 and is protruded between the flanges of the valve core 311.

Examples

Example 1. An airway structure of a massage pool with a control valve, comprising: an air connection passage with an air connection port; and a control plate rotatable relative to the air connection port. A control valve is installed at the air connection port, and the control valve has a valve core portion that can slide between an open position and a closed position relative to the air connection port. The control plate is provided with a ventilation port, an open area and a closed area. A position of the open area and the closed area are controlled by the rotation of the control plate to match the valve core portion. The control plate and the valve core portion are in a transmission connection and the rotation of the control plate can drive the valve core to slide, and the valve core portion is in the open position through the cooperation of the open area and the valve core portion to open the air connection port and the ventilation port and the air connection port are connected, and the valve core portion is in the closed position through the cooperation of the closed area and the valve core portion to close the air connection port.

Example 2. The airway structure of a massage pool with the control valve according to Example 1, wherein the control valve further has a valve base and an elastic body. The valve base is fixedly mounted on the air connection port. The valve core portion is slidably connected to the valve base. The elastic body is arranged between the valve core portion and the valve base and generates an elastic force to return to the valve core portion to the closed position. The bottom surface of the control plate and the valve core portion abut and fit, and the closed area and the open area are located on the bottom surface of the control plate. The open area is in a protruding arrangement relative to the closed area.

Example 3. The airway structure of a massage pool with the control valve according to Example 2, wherein the valve base comprises a sleeve and a guide base fixed outside the sleeve. The guide base includes a guide groove. The valve core portion comprises a valve core, a sealing portion fixed on the inner end of the valve core and a lug fixed on the outer end of the valve core. The valve core passes through the sleeve and a gap forming a channel is formed between the valve core and the sleeve. The sealing portion is fitting with the inner port of the sleeve. The lug is connected to the guide groove.

Example 4. The airway structure of a massage pool with the control valve according to Example 3, wherein the inner wall of the sleeve is protruded with at least two first protruding strips each having an end surface. The valve core is provided with at least two second protruding strips each having an end surface. The end surfaces of the at least two first protruding strips and the end surfaces of the second protruding strips are contacted in one-to-one correspondence. Air passages are formed between two adjacent first protruding strips and between two adjacent second protruding strips.

Example 5. The airway structure of a massage pool with the control valve according to Example 4, wherein the elastic body is sleeved on the valve core and abuts between an end of a first protruding strip and a flange protruding from the valve core.

Example 6. The airway structure of a massage pool with the control valve according to Example 2, wherein the ventilation port is arranged through the open area.

Example 7. The airway structure of a massage pool with the control valve according to Example 2, wherein the closed area and the open area of the bottom surface of the control plate are provided with a guide structure capable of cooperating with the valve core.

Example 8. The airway structure of a massage pool with the control valve according to Example 2, wherein the control plate is rotatable relative to the air connection port to the first position, the second position and a middle position between the first position and the second position, the closed area of the control plate at the middle position is matched with the valve core portion, and the open area of the control plate at the first position and the second position is matched with the valve core portion.

Example 9. The airway structure of a massage pool with the control valve according to Example 8, further comprising an air connection portion. The air connection portion is provided with the air connection passage. The air connection portion is protruded with a connecting base. The upper end surface of the connecting base concavely provides the air connection port and a C-shaped groove connectable to the air inlet. The ventilation port of the control plate located at the second position is aligned and connected to the air connection port, and the ventilation port of the control plate located at the first position is connected to the C-shaped groove.

Example 10. The airway structure of a massage pool with the control valve according to Example 8, further comprising an air connection portion. The air connection portion is provided with the air connection passage. The air connection portion is protruded with a connecting base, and the upper end surface of the connection base is concavely provided with the air connection port and a C-shaped groove connectable to the air connection port: the ventilation port of the control plate at the first position and the second position is connected to the C-shaped groove.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An airway structure of a massage pool with a control valve, comprising
an air connection passage with an air connection port; and
a control plate rotatable relative to the air connection port:
wherein a control valve is installed at the air connection port, and the control valve has a valve core portion that can slide between an open position and a closed position relative to the air connection port: the control plate is provided with a ventilation port, an open area and a closed area arranged on a bottom surface of the control plate, and a position of the open area and the closed area are controlled by the rotation of the control plate to match the valve core portion: the control plate and the valve core portion are in a transmission connection and the rotation of the control plate can drive the valve core to slide, and the valve core portion is in the open position through the cooperation of the open area and the valve core portion to open the air connection port and the ventilation port and the air connection port are connected, and the valve core portion is in the closed position through the cooperation of the closed area and the valve core portion to close the air connection port.

2. The airway structure of a massage pool with the control valve according to claim 1, wherein the control valve further has a valve base and an elastic body, the valve base is fixedly mounted on the air connection port, and the valve core portion is slidably connected to the valve base, the elastic body is arranged between the valve core portion and the valve base and generates an elastic force to return to the valve core portion to the closed position: the bottom surface of the control plate and the valve core portion abut and fit, the open area is in a protruding arrangement relative to the closed area.

3. The airway structure of a massage pool with the control valve according to claim 2, wherein the valve base comprises a sleeve and a guide base fixed outside the sleeve, the guide base including a guide groove: the valve core portion comprises a valve core, a sealing portion fixed on the inner end of the valve core and a lug fixed on the outer end of the valve core: the valve core passes through the sleeve and a gap forming a channel is formed between the valve core and the sleeve, and the sealing portion is fitting with the inner port of the sleeve, the lug is connected to the guide groove.

4. The airway structure of a massage pool with the control valve according to claim 3, wherein the inner wall of the sleeve is protruded with at least two first protruding strips each having an end surface, the valve core is provided with at least two second protruding strips each having an end surface, and the end surfaces of the at least two first protruding strips and the end surfaces of the second protruding strips are contacted in one-to-one correspondence, and air passages are formed between two adjacent first protruding strips and between two adjacent second protruding strips.

5. The airway structure of a massage pool with the control valve according to claim 4, wherein the elastic body is sleeved on the valve core and abuts between an end of a first protruding strip and a flange protruding from the valve core.

6. The airway structure of a massage pool with the control valve according to claim 2, wherein the ventilation port is arranged through the open area.

7. The airway structure of a massage pool with the control valve according to claim 2, wherein the closed area and the open area of the bottom surface of the control plate are provided with a guide structure capable of cooperating with the valve core.

8. The airway structure of a massage pool with the control valve according to claim 2, wherein the control plate is rotatable relative to the air connection port to the first position, the second position and a middle position between the first position and the second position, the closed area of the control plate at the middle position is matched with the valve core portion, and the open area of the control plate at the first position and the second position is matched with the valve core portion.

9. The airway structure of a massage pool with the control valve according to claim 8, further comprising an air connection portion, the air connection portion is provided with the air connection passage, the air connection portion is protruded with a connecting base, the upper end surface of the connecting base concavely provides the air connection port and a C-shaped groove connectable to the air inlet: the ventilation port of the control plate located at the second position is aligned and connected to the air connection port, and the ventilation port of the control plate located at the first position is connected to the C-shaped groove.

10. The airway structure of a massage pool with the control valve according to claim 8, further comprising an air connection portion, the air connection portion is provided with the air connection passage, the air connection portion is protruded with a connecting base, and the upper end surface of the connection base is concavely provided with the air connection port and a C-shaped groove connectable to the air connection port; the ventilation port of the control plate at the first position and the second position is connected to the C-shaped groove.

\* \* \* \* \*